United States Patent [19]
Gerace et al.

[11] Patent Number: 5,181,267
[45] Date of Patent: Jan. 19, 1993

[54] SHEATH CONNECTOR FOR AN OPTICAL CABLE

[75] Inventors: Jeffrey T. Gerace; Alan E. Plotts, both of Harrisburg; Frederic H. Abendschein, Columbia, all of Pa.

[73] Assignee: AMP Incorporated, Harrisburg, Pa.

[21] Appl. No.: 851,456

[22] Filed: Mar. 16, 1992

Related U.S. Application Data

[63] Continuation of Ser. No. 450,330, Dec. 13, 1989, Pat. No. 5,096,276, which is a continuation-in-part of Ser. No. 159,151, Feb. 23, 1988, abandoned.

[51] Int. Cl.⁵ .................................................. G02B 6/36
[52] U.S. Cl. .......................................... 385/86; 385/80
[58] Field of Search ..................... 385/78, 80, 86, 87, 385/69, 72

[56] References Cited

U.S. PATENT DOCUMENTS

| | | | |
|---|---|---|---|
| 4,204,306 | 5/1980 | Makuch | 29/281.5 |
| 4,252,406 | 2/1981 | Ryan, Jr. et al. | 350/96.21 |
| 4,362,356 | 12/1982 | Williams et al. | 350/96.20 |
| 4,440,469 | 4/1984 | Schumacher | 350/96.20 |
| 4,447,121 | 5/1984 | Cooper et al. | 350/96.20 |
| 4,634,214 | 6/1987 | Cannon, Jr. et al. | 350/96.20 |
| 4,645,296 | 2/1987 | Cattin et al. | 350/96.21 |
| 4,648,688 | 3/1987 | Ashman et al. | 350/96.20 |
| 4,679,895 | 7/1987 | Huber | 350/96.20 |
| 4,687,288 | 8/1987 | Margolin et al. | 350/96.20 |
| 4,705,352 | 10/1987 | Margolin et al. | 350/96.20 |
| 4,795,229 | 1/1989 | Abendschein et al. | 350/96.20 |
| 4,812,009 | 3/1989 | Carlisle et al. | 350/96.21 |

FOREIGN PATENT DOCUMENTS 0195432 9/1986 European Pat. Off. .

OTHER PUBLICATIONS

Patent Abstract of Japan, vol. 10, No. 41, Feb. 18, 1986.

*Primary Examiner*—Frank Gonzalez

[57] ABSTRACT

A connector 1 for assembly with an optical cable 2 comprises, a shell 10 encircling a spring biased holder 13 for an optical fiber 3 of the cable 2, a sheath 16 to prevent leaking of adhesive 59 from the holder 13, and strength members 5 of the cable 2 anchored to the shell 10, whereby the holder 13 and the optical fiber 3 of the cable 2 are displaceable with respect to the strength members 5 of the cable 2.

8 Claims, 7 Drawing Sheets

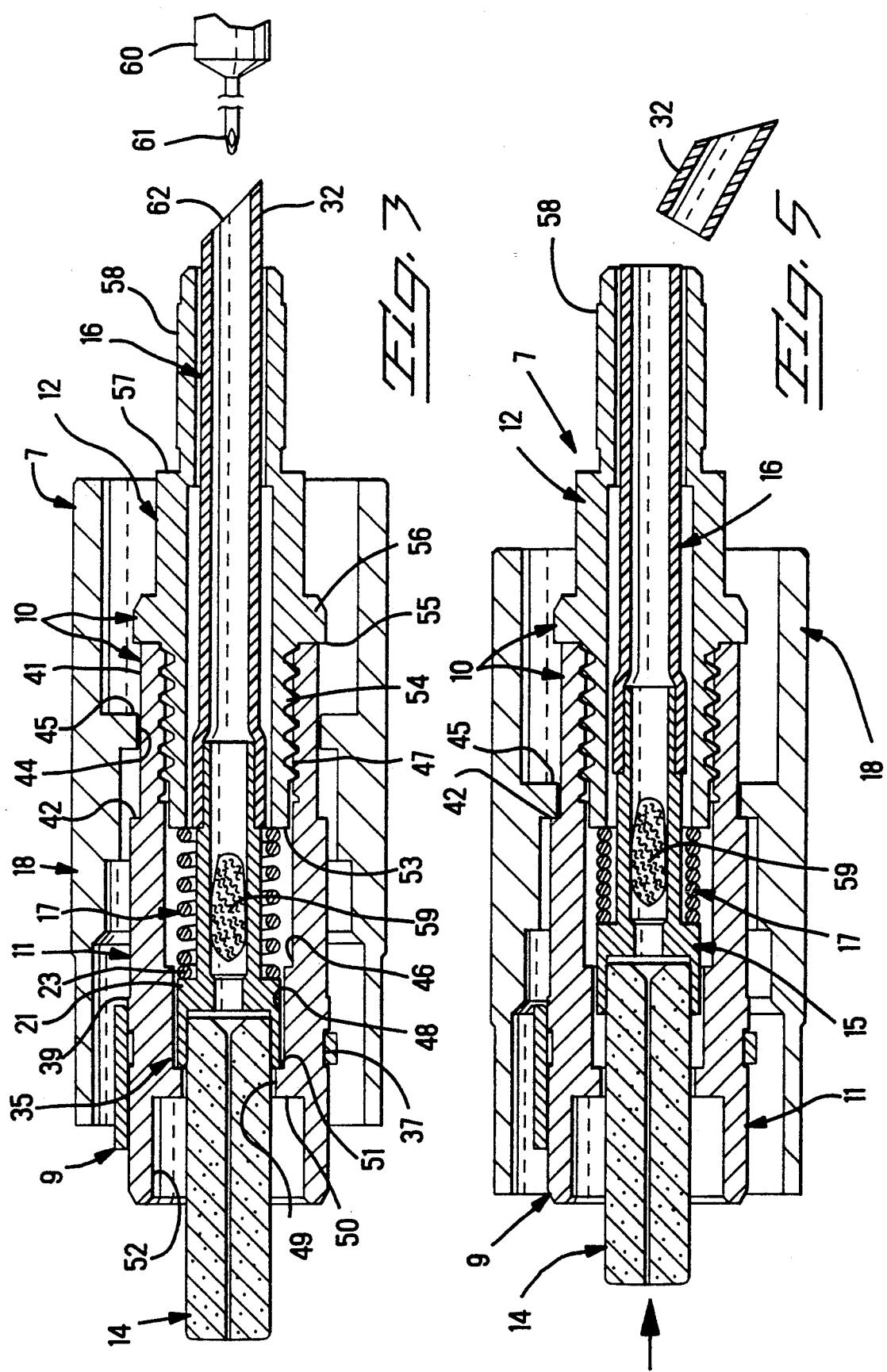

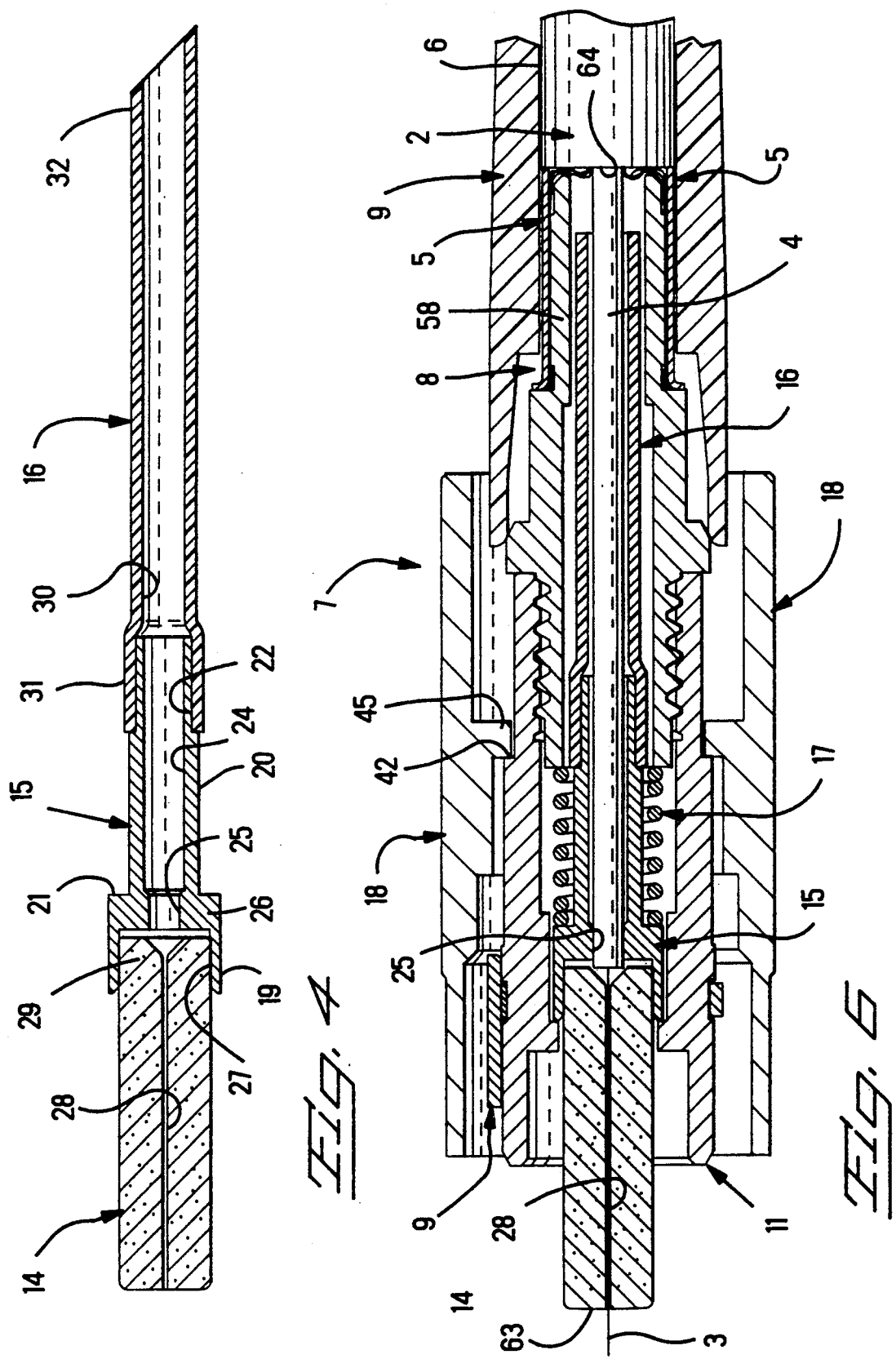

SHEATH CONNECTOR FOR AN OPTICAL CABLE

This application is a continuation of application Ser. No. 07/450,330 filed Dec. 13, 1989 and now U.S. Pat. No. 5,096,276, which is a Continuation In Part of Application Ser. No. 159,151 filed Feb. 23, 1988, now abandoned.

FIELD OF THE INVENTION

The invention relates to a connector for an optical fiber cable, and more particularly to an optical connector that is fully assembled before connection to an optical fiber cable.

BACKGROUND OF THE INVENTION

An optical cable is constructed with a central, buffer covered, optical fiber comprising an optical fiber for transmitting an optical signal, and a flexible buffer encircling the fiber and constructed of a solid polymeric material having a diameter many times larger than the diameter of the fiber. To resist a tensile force that might fracture the buffer covered fiber, the cable is constructed with a load bearing portion in the form of elongated strength members extending axially of the buffer covered fiber. The strength members extend between the sheath and the buffer covered fiber. For example, the strength members are elongated slender polymeric fibers of high tensile strength, such as KEVLAR, a trademark of E. I. DuPont de Nemours & Company, Wilmington, Delaware.

A connector is known from U.S. Pat. No. 4,634,214. The known connector includes a terminus piece rigidly attached to a connector body. Adhesive is injected into a longitudinal bore of the terminus piece. A stainless steel tube is inserted between strength members and a buffer covered fiber of an optical fiber cable. The cable and tube are inserted into the connector body, with the fiber of the cable projecting along a longitudinal bore provided in the terminus piece. Wicking of the adhesive along the cable is desirable. The adhesive wicks and adheres to the sheath, the connector body, the tube, the strength members, the fiber and the terminus piece. Wicking of the adhesive along the cable also may cause undesirable leaking of the adhesive externally of the connector body. A crimp is applied to the connector body to prevent undesired leaking due to wicking of the adhesive. However, wicking of the adhesive occurs before the crimp is applied. Thus undesired wicking may occur before the crimp is applied.

The known connector utilizes a bayonet locking mechanism on a housing to which is mounted the spring biased terminus piece. A further disadvantage resides in the fact that the fiber and the strength members of the cable are bonded by the adhesive and move as a unit with the spring biased terminus piece. Accordingly, when the housing is attached by the bayonet locking mechanism to another connector, and when a tensile force is applied to the cable, the cable and the terminus piece move as a unit, and the spring bias of the terminus piece is disturbed.

SUMMARY OF THE INVENTION

An aspect of the invention resides in a connector for an optical fiber cable that prevents leaking of adhesive externally of the connector. The component parts of the connector are assembled fully before the connector is assembled to an optical fiber cable. The construction of the connector prevents leaking of the adhesive without a crimp.

According to another aspect of the invention, a connector of an optical fiber cable mounts an optical fiber of the cable in a holder that reciprocates against the bias of a biasing spring. The fiber and the holder reciprocate with respect to a load bearing portion of the cable that is anchored to a shell of the connector.

By way of example, the invention pertains to assembling a connector to an optical cable, wherein the connector includes, a shell and a displaceable holder for an optical fiber of the cable, and wherein an optical fiber of the cable is assembled in the holder with an optical face of the optical fiber at a front end of the holder. The connector is assembled to the cable by providing on the holder a sheath that opens into the holder, assembling in the sheath and in the holder an adhesive and an optical fiber that projects from a load bearing portion of the cable, and securing the shell to the load bearing portion, whereby the optical fiber and the sheath and the holder are assembled for axial displacement with respect to the load bearing portion of the cable and the shell of the connector.

By way of example, the invention pertains to a connector for assembly with an optical cable having a load bearing portion and an optical fiber, the connector comprises, a holder for securing to an optical fiber of the cable with an optical face of the optical fiber at a front end of the holder, a shell encircling the holder, and cable anchoring means on the shell for securing to the load bearing portion of the cable, the holder includes sheath means for passage of an adhesive and an optical fiber into the holder, and the holder and the sheath means are mounted for displacement within the cable anchoring means, whereby an optical fiber of an optical cable secured to the holder is displaceable with respect to a load bearing portion of the cable secured to the cable anchoring means on the shell.

Other advantages and aspects of the invention are apparent by way of example from a detailed description that follows, and from accompanying drawings.

DESCRIPTION OF THE DRAWINGS

FIG. 3 is an enlarged elevation view in section of an assembly of the portion of the connector shown in FIG. 2.

FIG. 4 is an enlarged elevation view in section of some of the parts illustrated in FIG. 3.

FIG. 5 is a view similar to FIG. 3, and illustrating the parts shown in FIG. 3, with a quantity of adhesive.

FIG. 6 is a view similar to FIG. 3, and illustrating assembly of a cable with the parts shown in FIGS. 1 and 3.

DETAILED DESCRIPTION

Figure 1:
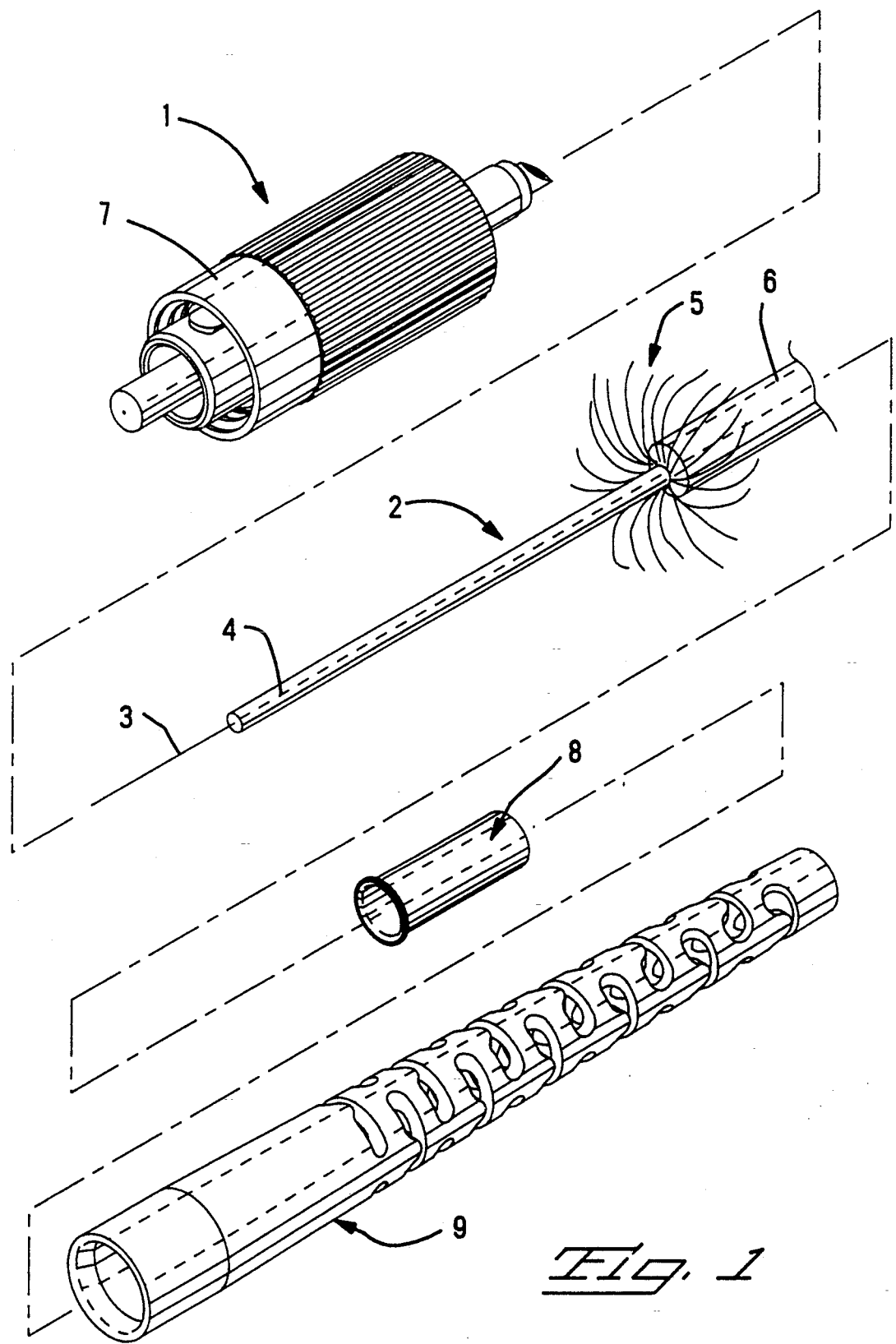
FIG. 1 is a perspective view of a connector for optical fiber cable with a crimp ferrule and a strain relief of the connector illustrated in exploded configuration.

With more particular reference to the drawings there is illustrated, by way of example, in FIG. 1 a connector 1 for an optical fiber cable 2, wherein the cable includes an elongated central optical fiber 3 concentrically encircled by a buffer 4, together comprising a buffer covered fiber. The cable 2 further includes a load bearing portion 5 in the form of elongated strength members 5 that extend lengthwise of the cable 2. The strength members 5 are distributed over the outer diameter of the buffer covered fiber 3,4. The cable 2 further includes an outer jacket 6 of polymeric material enclosing the strength members 5. Parts of the cable 2 are cut away as shown to provide; a length of fiber 3 projecting from the buffer 4 of the cable 2, and a length of the buffer covered fiber 3,4 projecting from the strength members 5, and lengths of the strength members 5 projecting from the jacket 6. The buffer covered fiber 3,4 is slidable within the jacket 6 and within the surrounding strength members 5.

The connector 1 includes a connector assembly 7 and a crimp ferrule 8. A tubular strain relief boot 9 also is shown.

Figure 2:
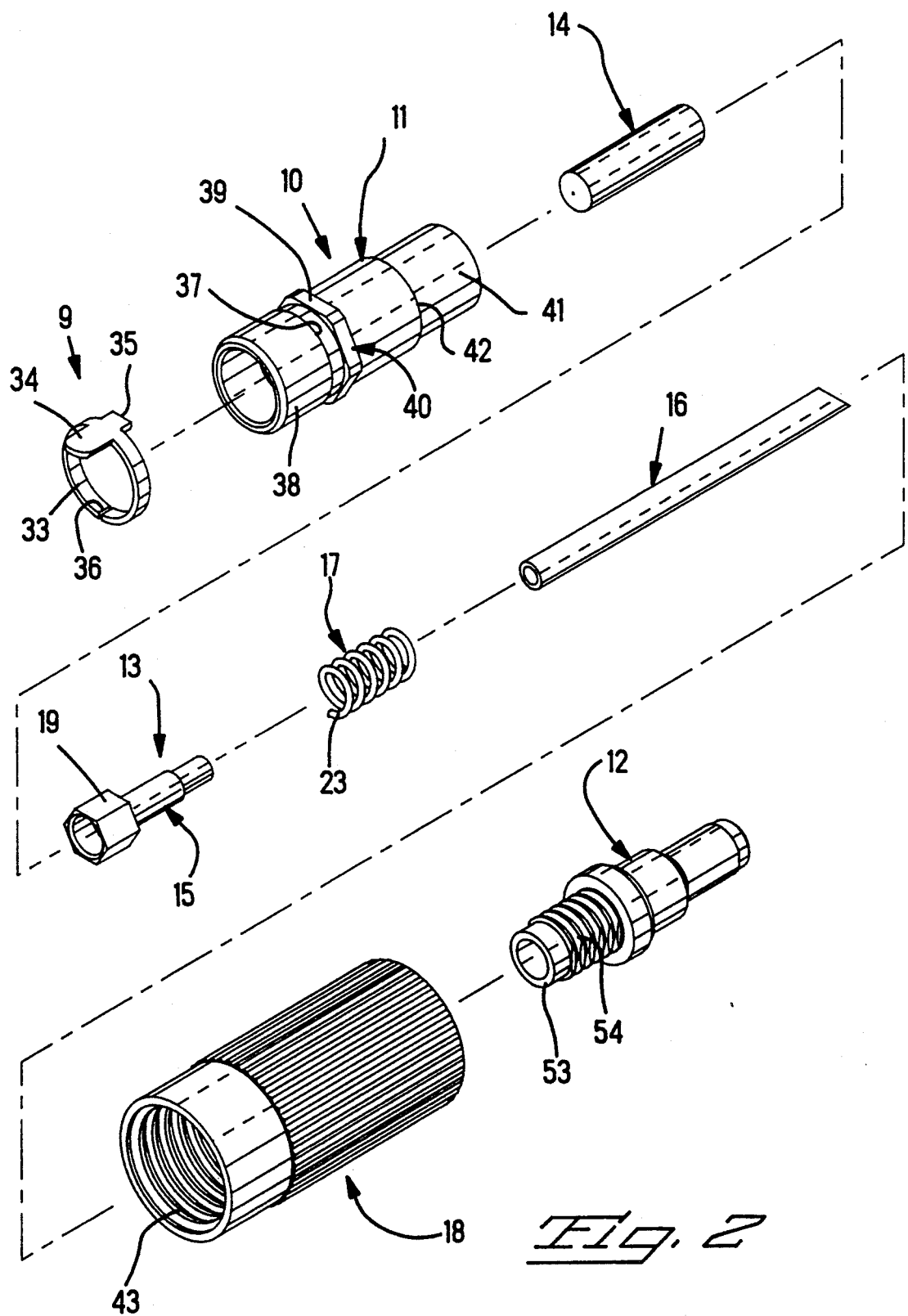
FIG. 2 is a perspective view of of a portion of the connector shown in FIG. 1, with additional parts illustrated in exploded configuration.

As shown in FIGS. 2 and 3, the connector assembly 7 includes; a metal polarizing ring 9', a metal shell 10 comprised of a front shell portion 11 and a rear shell portion 12 and the crimp ferrule 8, a holder 13 for the optical fiber comprised of a ceramic alignment ferrule 14 and a metal body 15 and a sheath 16, a biasing spring 17 of coil form, and an internally threaded coupling ring 18.

As shown in FIGS. 2 and 4, the body 15 includes an enlarged front end 19 with an external hexagonal cross section, a reduced external diameter intermediate portion 20 intersecting a rear facing shoulder 21 of the enlarged front end 19, and a rear end 22 with a reduced external diameter. The coil spring 17 is assembled as shown in FIG. 3 to encircle the reduced external diameter portion 20, with a front end 23 of the coil spring 17 engaged and biased against the shoulder 21.

The body 15 includes an axial passageway 24 extending from the rear end 22. The passageway 24 has a reduced diameter, funnel entryway 25 extending through an internal transverse web 26, and an enlarged diameter counterbore 27 in the front end 19. The ceramic alignment ferrule 14 has a central longitudinal bore 28 aligned with the entryway 25. A rear end 29 of the ferrule 14 is press fit in the counterbore 27 of the body 15. The sheath 16 is a length of flexible plastic tubing having a hollow interior 30, a front end 31 assembled to encircle the reduced diameter rear end 22 of the body 15, and a rear end portion 32. The sheath 16 is held on the body 15 by friction.

The polarizing ring 9' is shown in FIG. 2, and is stamped and formed from a single strip of metal, and includes an elongated strap 33 and a finger 34 projecting transversely of the strap 33. A tab 35 is aligned with the finger 34 and projects transversely of the strap 33 in a direction opposite to that of the finger 34. The strap 33 is curved to form a ring that is transversely bifurcated by a seam 36. The strap 33 is assembled for rotation in an external circumferential groove 37 encircling a front end 38 of the front shell portion 11, with the finger 34 pointing to the front end 38 of the front shell portion 11, and with the tab 35 overlapping and engaged on one of the flat surfaces 39 of a radially projecting collar 40 of hexagonal cross section on the exterior of the front shell portion 11. The front shell portion 11 includes a rear end 41 with a reduced external diameter intersecting a rear facing external shoulder 42. The coupling ring 18 has an enlarged diameter, internally threaded front end 43 and a reduced internal diameter opening 44 extending through a transverse wall 45. The coupling ring 18 is assembled with the opening 44 received slidably over the rear end 41 of the front shell portion 11.

The front shell portion 11 includes an axial cavity 46 having an enlarged diameter rear end 47 that is internally threaded, an intermediate portion 48 having a hexagon shaped periphery 48, and a reduced diameter front portion 49 extending through an end wall 50 of the front body portion 11. A rear facing, radially extending internal shoulder 51 is defined at the intersection of the diameter portions 48 and 49. A cylindrical hood 52 with an enlarged internal diameter extends forwardly from the front of the end wall 50.

The rear shell portion 12 includes a front end 53, an externally threaded forward portion 54 extending to a front facing external shoulder 55 defined by an exterior circumferential flange 56, a rear facing external shoulder 57 forwardly of a reduced external diameter end portion 58. The reduced diameter end portion 58 defines a cable anchoring portion 58.

As shown in FIG. 3, the holder 15 and the biasing spring 17 are assembled together and are assembled in the cavity 46 of the front shell portion 11, with the alignment ferrule 14 projecting through the end wall 50 forwardly of the end wall 50 and the hood 52, and with the sheath 16 projecting outwardly of the rear end 58 of the rear shell portion 12. The rear shell portion 12 is slidably assembled over the sheath 16 of the body 10 and is threadably advanced along the internally threaded rear end 41 of the front body portion 11 until the shoulder 55 engages the rear end 41 of the front shell portion 11. The biasing spring 17 is in compression between the front end 53 of the rear shell portion 12 and the shoulder 21 of the body 15. Thereby the holder 13 is biased forwardly by the spring 17 and is mounted for axial slidable displacement and reciprocation with respect to the shell 10. The hexagonal front end 19 of the body 15 is confined by the hexagonal periphery 48 of the cavity 46 to prevent rotation of the holder 13 in the cavity 46. The coupling ring 18 is slidable over the shell 10 and confined between the shoulders 42 and 55. Thereby the connector assembly 7 is fully assembled.

Assembly of the connector 1 to the cable 2 is described as follows. The cable 2 is passed successively along the interiors of the strain relief boot 9 and the crimp ferrule 8. As shown in FIG. 3, a quantity of a known, commercially available adhesive 59 is deposited in the body 15 of the holder 13. For example, the adhesive 59 may be injected by a syringe 60 having an elongated hollow needle 61. The needle 61 is introduced into the end portion 32 of the sheath 16 which has been cut at an angle to provide an enlarged elliptical mouth 62 at the end portion 32 of the open tubular sheath 16. The rear end portion 32 of the sheath 16 projects outwardly from the cable anchoring portion 58 of the shell 10, and sheaths the needle 61 during entry and withdrawal from the sheath 16. The shell 10 is protected against touching by the needle 61 and against deposition of adhesive 59. The needle 61 is passed substantially along the interior of the sheath 16 before depositing the quantity of adhesive 59 within the body 15 of the holder 13. The adhesive 59 is deposited near the front end 19 of the body 15, adjacent to the alignment ferrule 14 and remote from the open rear end portion 32 of the sheath 16. The sheath 16 prevents leaking of the adhesive 59 from the holder 13 and prevents the adhesive 59 from spreading over the spring 17 and the shell 10.

As shown in FIG. 5, following withdrawal of the needle 61, the alignment ferrule 14 is pressed against a stationary surface, for example a table, not shown, causing the holder 13 to be slidably displaced, compressing the coil spring 17, and projecting the rear end portion 32 of the sheath 16 further outward from the rear end 58 of the shell 10. The projecting rear end portion 32 of the sheath 16 is then cut away and removed from the connector assembly 7. The plastic tube is easily cut. Upon expansion of the coils of the biasing spring 17, the sheath 16 is retracted within the shell 10, as shown in FIG. 6. The buffer covered fiber 3,4 of the cable 2 is assembled in the rear end 58 of the shell 10 and into and along the sheath 16. The sheath 16 internal diameter receives and guides the buffer covered fiber 3,4 for assembly along the passageway 24 of the body 15. The entry 25 of the passageway 24 guides the fiber 3 of the cable 2 into the bore 28 of the alignment ferrule 14. The periphery of the entry encircles and supports the buffer covered fiber 3,4. The front end of the fiber 3 is exposed at a front end 63 of the ferrule 14 and is finished with an optical face, by a known procedure of polishing or refracturing. The sheath 16 closely encircles the buffer covered fiber 3,4 to prevent wicking of the adhesive 59 along the buffer covered fiber 3,4 to such an extent that the adhesive 59 leaks from the open rear end of the sheath 16. The adhesive 59 will be brought into contact with and will coat the fiber 3 and the buffer covered fiber 3,4, and further, the adhesive 59 will be urged forwardly of the holder 13 by the buffer covered fiber 3,4, as the buffer covered fiber 3,4 moves forwardly of the sheath 16 and of the body 15 and of the alignment ferrule 14. It is not necessary for the adhesive 59 to wick in a direction rearward of the buffer covered fiber 3,4 or rearwardly of the holder 13, since the adhesive 59 is desired only to bond the buffer covered fiber 3,4 within the holder 13, and the fiber 3 in the alignment ferrule 14.

The internal diameter of the shell rear end 58 is smaller than the external diameter of the cable jacket 6. Thus, the jacket 6 remains outside of the shell 10, while the shell rear end 58 opposes a front end 64 of the cable jacket 6. The strength members 5 are placed to overlap the exterior of the shell rear end 58. The crimp ferrule 8 is displaced along the cable 2 to a position concentrically encircling the shell rear end 58. Pressure is radially applied on the crimp ferrule 8 to compress the ferrule radially inward to clamp the strength members 5 between the ferrule 8 and the shell rear end 58. Thereby, the strength members 5 are anchored to the shell rear end 58. The strain relief boot 9 is advanced along the cable 2 to encircle the ferrule 8 and the jacket 6 of the cable 2 where the jacket 6 projects adjacent to the shell 10. The buffer covered fiber 3,4 and the holder 13 are joined together as a unit by the adhesive 59 for reciprocation and axial slidable displacement with respect to the shell 10 and the coupling ring 18 and the strength members 5 and the jacket 6 of the cable 2. When the coupling ring 18 is threadably attached to a complementary connector, not shown, the coupling ring 18 engages the shoulder 42. The end 63 of the alignment ferrule 14 engages a portion of the complementary connector and is slidably biased rearwardly of the connector 1 against the bias of the coil spring 17. The bias of the coil spring 17 will urge the end 63 of the ferrule 14 in a direction forwardly of the connector 1 and engaged against the portion of the complementary connector, to maintain a desired alignment of the optical face of the fiber 3 with the portion of the complementary connector. According to an aspect of the invention, the strength members 5 of the cable 2 are anchored to the shell 10, whereby the strength members and the shell 10 are connected together as a unit. Should a tensile force be applied to the cable 2, the force will be transmitted along the shell and to the coupling ring and to the complementary connector. The spring bias on the holder 13 is not disturbed by the tensile force. The buffer covered optical fiber 3,4 is not slidably displaced by the tensile force, and the desired alignment of the optical face of the fiber 3 is not disturbed, and the desired engagement of the ferrule 14 with the complementary connector is not disturbed.

Figure 7:
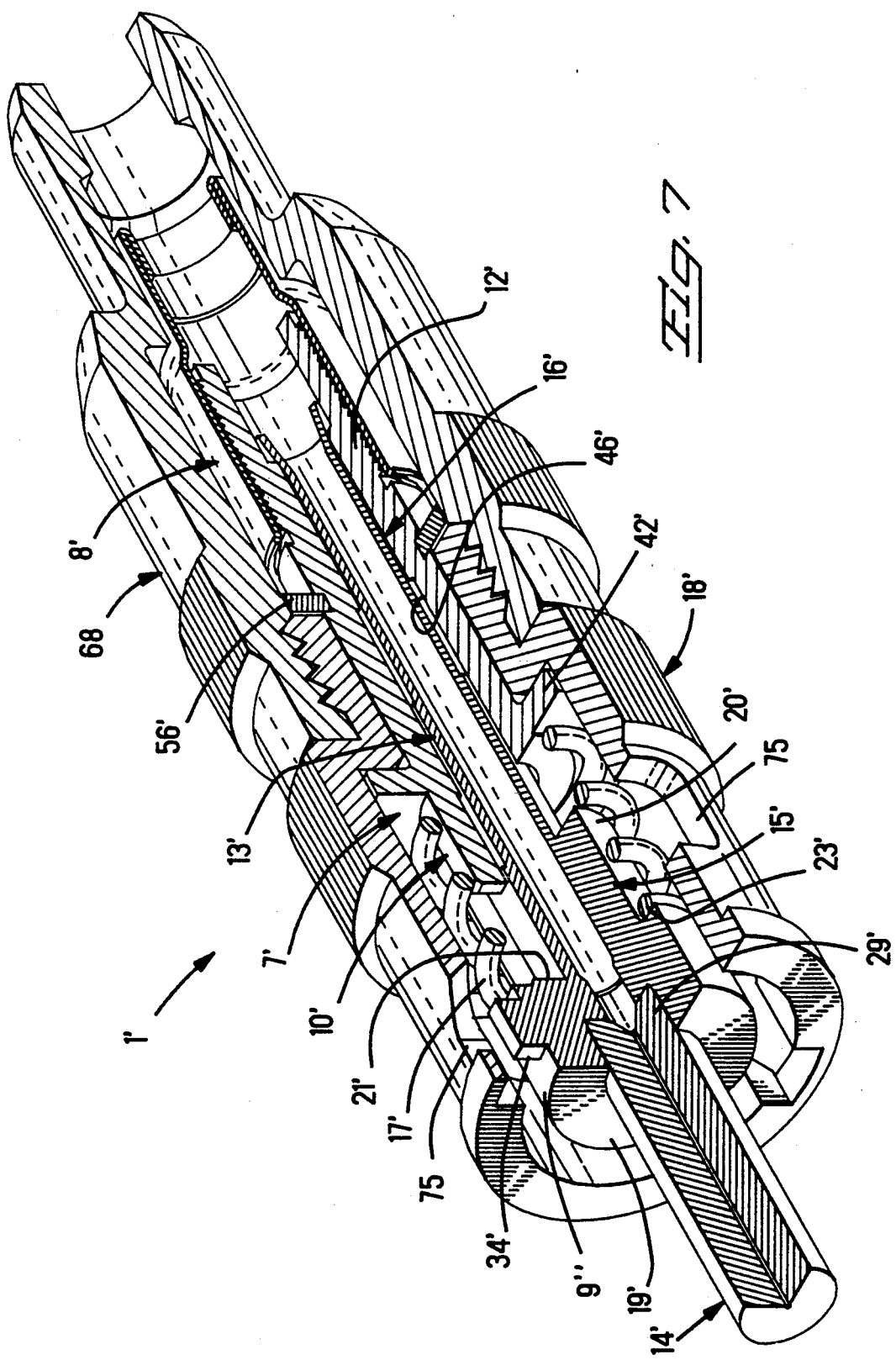
FIG. 7 is a perspective view partially cut away of a further connector for optical fiber cable.
Figure 8:
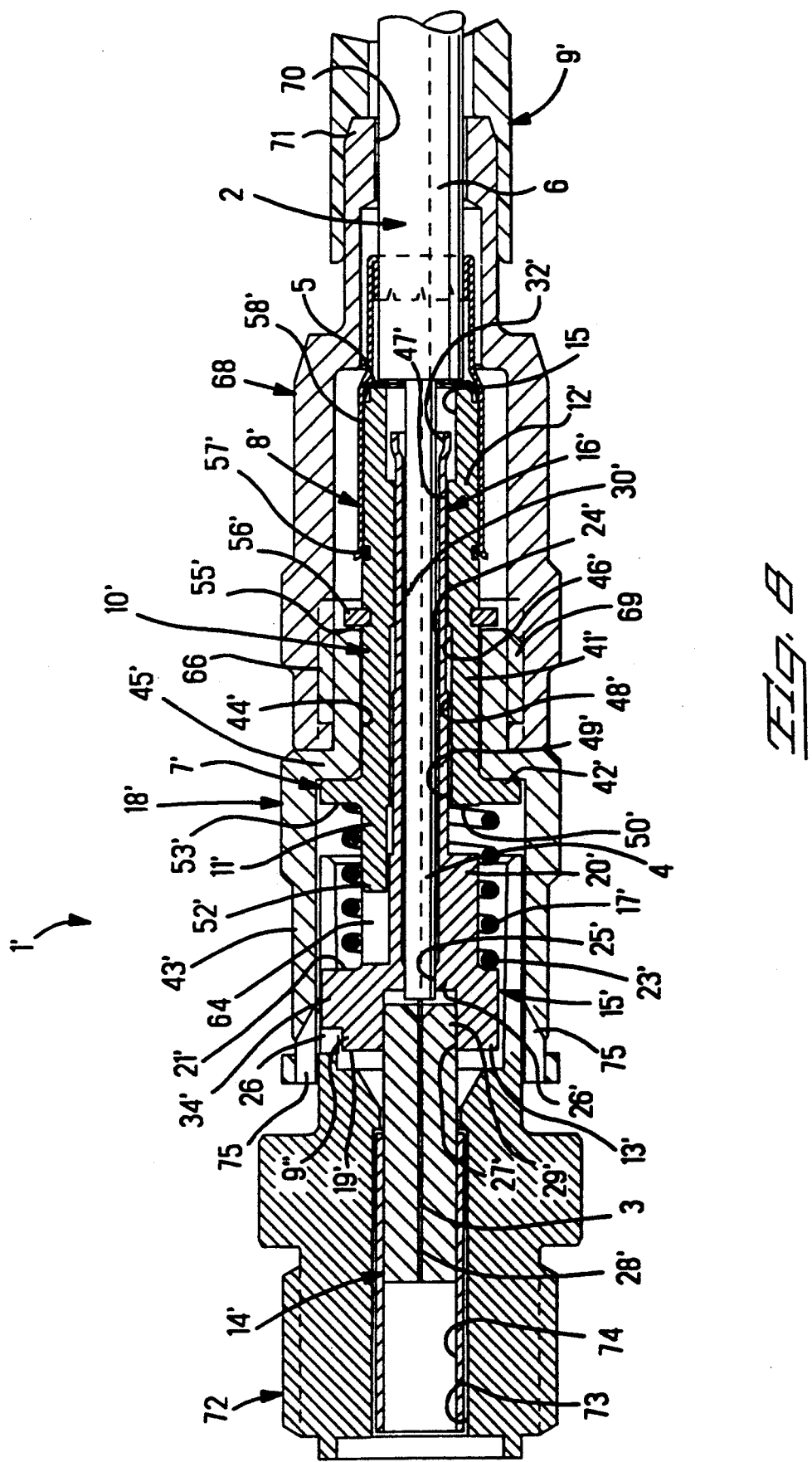
FIG. 8 is a section view of the connector shown in FIG. 7.

With reference to FIGS. 7 and 8, a connector 1' for the optical fiber cable 2 includes a connector assembly 7' which includes; a crimp ferrule 8', a metal shell 10' with a front shell portion 11', a rear shell portion 12', a holder 13' for the optical fiber 3 comprised of a metal, plastic or ceramic alignment ferrule 14' a metal body 15', a sheath 16' integral with the body 15', a biasing spring 17' of coil form, and a coupling ring 18'. The body 15' includes an enlarged front end 19' and a reduced external diameter intermediate portion 20' intersecting a rear facing shoulder 21' of the front end 19'. The coil spring 17' is assembled to encircle the reduced external diameter portion 20' with a front end 23' of the coil spring 17' engaged and biased against the shoulder 21'. The body 15' includes an axial passageway 24' that has a reduced diameter, funnel entryway 25' extending through an internal transverse web 26', and enlarged diameter counter bore 27' in the front end 19'. The ceramic alignment ferrule 14' has a central longitudinal bore 28' aligned with the entryway 25'. A rear end 29' of the ferrule 14' is press fit in the counterbore 27' of the body 15'. The sheath 16' is tubing shaped having a hollow interior 30' formed by the passageway 24', and a rear end portion 32'.

The front end 19' of the body 15' provides a polarizing ring 9" that includes a finger 34' projecting transversely. The front shell portion 11' includes a rear facing external shoulder 42'. The coupling ring 18' has an enlarged diameter, front end 43' and a reduced internal diameter opening 44' extending through a transverse wall 45'. The coupling ring 18' is assembled with the opening 44' received slidably over the rear end 41' of the front shell portion 11'.

The front shell portion 11' includes an axial cavity 46' having a rear end 47', an intermediate portion 48' and a front portion 49' extending through an end wall 50' of the front body portion 11'. A hood 52' extends forwardly from the front of the end wall 50', and is shaped to provide a forward extending key. The key is slidably received in a longitudinal keyway 64 along the body 15' to permit longitudinal movement of the body 15' with respect to the shell 10', but to prevent rotational movement of the body 15' with respect to the shell 10'.

The rear shell portion 12, extends to a front facing external shoulder 55' defined by an exterior spring clip 56', and a rear facing external shoulder 57' forwardly of a diameter end portion 58' defining a cable anchoring portion.

Figure 9:
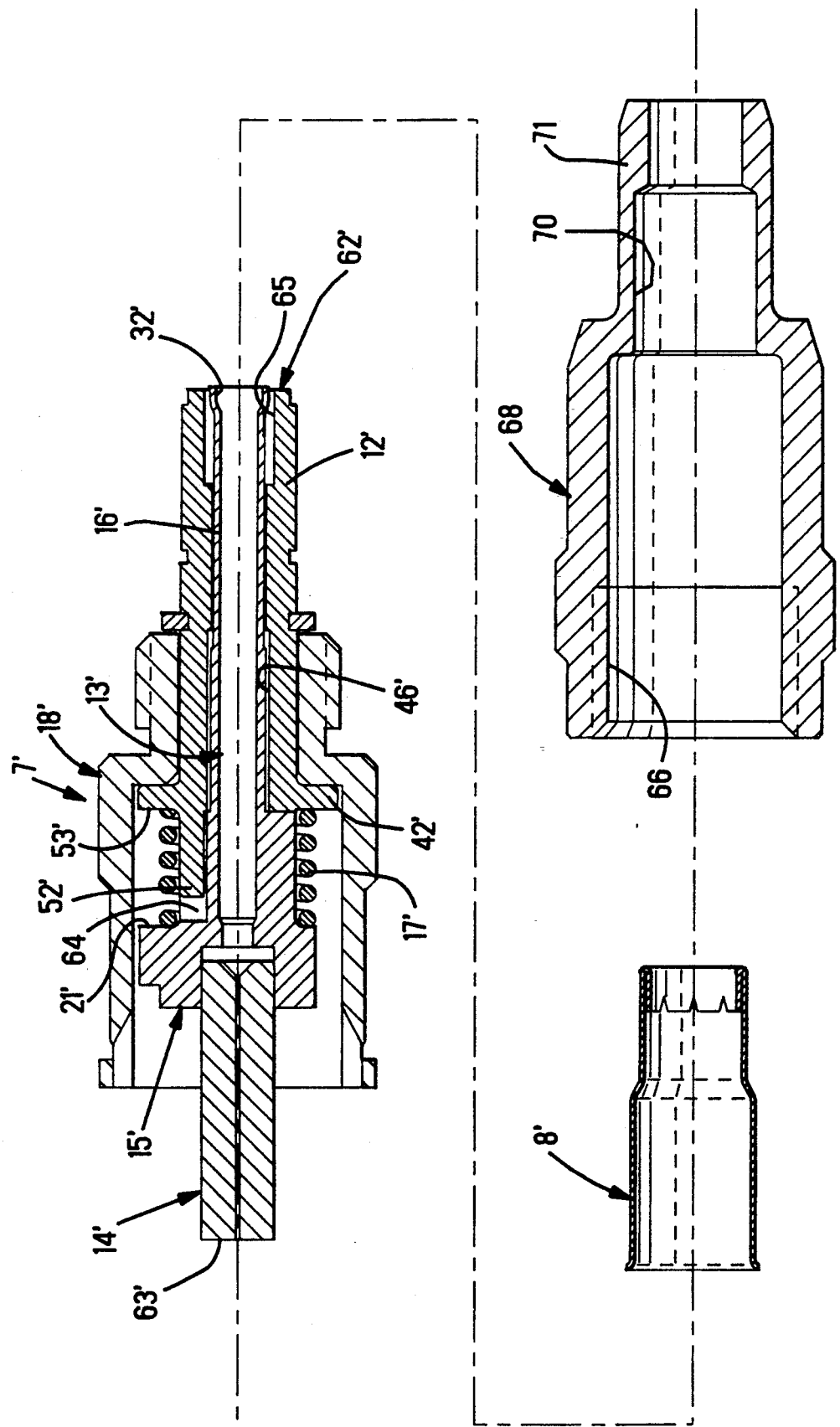
FIG. 9 is a section view of a portion of the connector shown in FIG. 7.

With reference to FIG. 9, the holder 15' and the biasing spring 17' are assembled together and are assembled in the cavity 46' of the front shell portion 11', with the alignment ferrule 14' projecting through the end wall 50' forwardly of the end wall 50', and with the sheath 16' projecting outwardly of the rear end 58' of the rear shell portion 12'. The rear shell portion 12' is slidably assembled over the sheath 16' of the body 10'. Then the end 32' of the sheath 16' is outwardly flared to limit forward movement of the sheath 16' within an enlarged cavity portion 65 of the rear shell portion 12'. The biasing spring 17' is in compression between the front end 53' of the rear shell portion 12' and the shoulder 21' of the body 15'. Thereby the holder 13' is biased forwardly by the spring 17' and is mounted for axial slidable displacement and reciprocation with respect to the shell 10'. The keyway 64 and hood 52' prevent rotation of the holder 13' in the cavity 46'. The coupling ring 18' is assembled over the shell 10'. The spring clip 56' is assembled behind the coupling ring 18'. Thereby the connector assembly 7' is fully assembled.

With reference to FIGS. 7 and 8, a rear of the coupling ring 18' includes external threads 66. An elongated sleeve 68 has an internally threaded front end 69 to be secured on the threads 66. The sleeve 68 extends rearward and has a hollow interior 70 to encircle the body 10' and the crimp ring 8'. A rear end 71 of the sleeve 68 is to be secured to the strain relief 9'.

Assembly of the connector 1' to the cable 2 is described as follows. A quantity of a known, commercially available adhesive is deposited in the body 15' of the holder 13'. For example, the adhesive may be injected by a syringe having an elongated hollow needle introduced into the end portion 32' of the sheath 16' which has been flared to provide an enlarged mouth 62', FIG. 9. The rear end portion 32' of the sheath 16' projects outwardly from the cable anchoring portion 58' of the shell 10', when the biasing spring 17' is compressed as shown in FIG. 9, and the sheath 16' is slid rearward of the shell 10'. The rear end portion 32' sheaths the needle during entry and withdrawal from the sheath 16'. The shell 10' is protected against touching by the needle and against deposition of adhesive. The needle is passed substantially along the interior of the sheath 16' before depositing the quantity of adhesive within the body 15' of the holder 13'. The adhesive is deposited near the front end 19' of the body 15', adjacent to the alignment ferrule 14' and remote from the open rear end portion 32' of the sheath 16'. The sheath 16' prevents leaking of the adhesive from the holder 13' and prevents the adhesive from spreading over the spring 17' and the shell 10.

Upon expansion of the coils of the biasing spring 17', the sheath 16' is retracted within the shell 10'. The cable 2 is passed successively along the interiors of the strain relief boot 9, the sleeve 68 and the crimp ferrule 8'. The buffer covered fiber 3,4 of the cable 2 is assembled in the rear end 58' of the shell 10' and into and along the sheath 16'. The sheath 16 internal diameter receives and guides the buffer covered fiber 3,4 for assembly along the passageway 24' of the body 15'. The entry 25' of the passageway 24' guides the fiber 3 of the cable 2 into the bore 28' of the alignment ferrule 14. The periphery of the entry encircles and supports the buffer covered fiber 3,4. The front end of the fiber 3 is exposed at a front end 63' of the alignment ferrule 14' and is finished with an optical face, by a known procedure of polishing or fracturing. The sheath 16' closely encircles the buffer covered fiber 3,4 to prevent wicking of the adhesive along the buffer covered fiber 3,4 to such an extent that the adhesive leaks from the open rear end of the sheath 16'. The adhesive will be brought into contact with and will coat the fiber 3 and the buffer covered fiber 3,4 and further, will be urged forwardly of the holder 13' by the buffer covered fiber 3,4 as the buffer covered fiber 3,4 moves forwardly of the sheath 16' and of the body 15' and of the alignment ferrule 14'. It is not necessary for the adhesive to wick in a direction rearward of the buffer covered fiber 3,4 or rearwardly of the holder 13, since the adhesive is desired only to bond the buffer covered fiber 3,4 within the holder 13', and the fiber 3 in the alignment ferrule 14'.

The internal diameter of the shell rear end 58' is smaller than the external diameter of the cable jacket 6. Thus the jacket 6 remains outside of the shell 10', while the shell rear end 58' opposes a front end 64' of the cable jacket 6'. The strength members 5 are placed to overlap the exterior of the shell rear end 58. The crimp ferrule 8' is displaced along the cable 2 to a position concentrically encircling the shell rear end 58'. Thereby, the strength members 5 are anchored to the shell rear end 58'. The crimp ferrule 8' encircles the jacket 6 of the cable 2 where the jacket 6 projects adjacent to the shell 10'. The sleeve 68 is advanced along the cable 2 and is threadably secured to the coupling ring 18'.

As shown in FIG. 8, the sleeve 68 encircles the rear end portion 12' of the shell and the crimp ferrule 8'. The end 71 of the sleeve 68 encircles the cable 2, FIG. 8, and transfers bending stress from the cable to the coupling ring 18'. The strain relief boot 9' is advanced along the cable 2 to encircle the crimp ferrule 8' and the jacket 6 of the cable 2 where the jacket 6 projects adjacent to the end 71. The connector 1' is shown connected to a complementary alignment connector 72 having an alignment passage 72 and an alignment sleeve 74 in the passage 73 and receiving the ferrule 14' therein. The coupling ring 18' is coupled to the exterior of the alignment connector 72, for example, by bayonet slots 75 in the coupling ring 18' coupled to bayonet prongs, not shown, on the exterior of the alignment connector 72. The finger 34' is slidably received along an open end slot 76 of the alignment connector 72 to prevent relative rotation of the ferrule 14'. An advantage of the invention is that the coupling ring 18' is permitted relative reciprocation in a space separating the flange 7' and the spring clip 56', while the coupling ring and the sleeve 68, together with the strain relief boot 9', are reciprocatable and rotatable relative to the component parts of the connector 1' and the complementary alignment connector 72, during connection and disconnection of the coupling ring 18' with the complementary connector 72, and while the ferrule 14' and the shell 10' are prevented from relative rotation. If desired, relative rotation between the strain relief boot 9' and the sleeve 68 can occur when the sleeve 68 is rotated with rotation of the coupling ring 18'. This allows relative rotation as well as relative reciprocation of the coupling ring 18' to permit full seating of the coupling ring 18' with the bayonet prongs to connect or disconnect to the complementary alignment connector 72, while the sleeve 68 and strain relief boot 9' remain fully assembled with the coupling ring 18'.

The buffer covered fiber 3,4 and the holder 13' are joined together as a unit by the adhesive for reciprocation and axial slidable displacement with respect to the shell 10' and the coupling ring 18' and the strength members 5 and the jacket 6 of the cable 2. The end of the alignment ferrule 14' engages a portion of a complementary connector, not shown, in the alignment sleeve 74, and is slidably biased rearwardly of the connector 1 against the bias of the spring 17'. The bias of the spring 17' will urge the end 63' of the ferrule 14' in a direction forwardly of the connector 1' and engaged against the portion of the complementary connector, to maintain a desired alignment of the optical face of the fiber 3 with the portion of the complementary connector. According to an aspect of the invention, the strength members 5 of the cable 2 are anchored to the shell 10', whereby the strength members 5 and the shell 10' are connected together as a unit. Should a tensile force be applied to the cable 2, the force will be transmitted along the shell 10' and to the coupling ring 18' and to the complementary alignment connector 72. The spring bias on the holder 13' is not disturbed by the tensile force. The buffer covered optical fiber 3,4 is not slidably displaced by the tensile force, and the desired alignment of the optical face of the fiber 3 is not disturbed, and the desired engagement of the ferrule 14' with complementary connector is not disturbed.

The invention has been described by way of example only, and other modifications and embodiments of the invention are intended to be covered by the spirit and scope of the claims.

We claim:

1. A connector for an optical fiber cable, comprising: a shell adapted to be secure to a load bearing portion of a fiber optic cable, a holder for an optical fiber of the fiber optic cable adapted to be secured by adhesive to the optical fiber, the holder being mounted to the shell for relative displacement therewith, a sheath extending rearwardly from the holder and toward a rear of the shell, the sheath being adapted to be displaced along the shell upon displacement of the holder relative to the shell, and the sheath being adapted to encircle a buffer covered portion of the optical fiber and to prevent adhesive from leaking from the holder to an inside of the shell.

2. A connector as recited in claim 1, comprising: a coil spring in the shell and encircling the holder, the spring being adapted to be compressed between the holder and the shell.

3. A connector as recited in claim 2, comprising: the shell having a front portion and a rear portion connected to the front portion, and the coil spring being adapted to be compressed between the holder and the rear portion of the shell.

4. A connector as recited in claim 1, comprising: a coil spring in the shell and encircling the holder, the spring being adapted to be urged by the holder against the shell to displace the sheath along the shell.

5. A connector as recited in claim 1, comprising: the sheath includes a rear end portion that projects from the shell, and the rear end portion is removable.

6. A connector as recited in claim 1, comprising: means on the holder and the shell for preventing rotation of the holder relative to the shell.

7. A connector as recited in claim 1, comprising: a rear portion of the shell extending beyond an end of the sheath and adapted to be connected to a strain relief, and a strain relief adapted to be connected to the rear portion of the shell.

8. A method for assembling a connector to an optical fiber cable, comprising the steps of: depositing adhesive in a holder for an optical fiber, the holder being mounted for displacement with a shell, inserting an optical fiber of the cable along a sheath extending from the holder and along an inside of the shell, the sheath preventing the adhesive from leaking from the holder to the inside of the sheath, connecting strength members of the cable to the shell after the optical fiber has entered the holder, and connecting a strain relief to the shell.

* * * * *

UNITED STATES PATENT AND TRADEMARK OFFICE
CERTIFICATE OF CORRECTION

PATENT NO.  : 5,181,267
DATED       : January 19, 1993
INVENTOR(S) : Jeffrey T. Gerace et al.

It is certified that error appears in the above-indentified patent and that said Letters Patent is hereby corrected as shown below:

Column 9, line 28, claim 1, "secure" should be --secured--

Signed and Sealed this

Twenty-ninth Day of March, 1994

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO.      : 5,181,267
DATED           : January 19, 1993
INVENTOR(S)     : Jeffrey T. Gerace et al.

It is certified that error appears in the above-identified patent and that said Letters Patent is hereby corrected as shown below:

Column 8,
Line 4, delete "sheath," and substitute -- shell, -- in its place.

Signed and Sealed this

Fourteenth Day of October, 2003

JAMES E. ROGAN
*Director of the United States Patent and Trademark Office*

Disclaimer 5,181,267—Jeffrey T. Gerace; Alan E. Plotts, both of Harrisburg; Frederic H. Abendschein, Columbia, all of Pa. SHEATH CONNECTOR FOR AN OPTICAL CABLE. Patent dated January 19, 1993. Disclaimer filed September 22, 2003, by the assignee, Tyco Electronics Corporation.

The term of this patent shall not extend beyond the expiration date of Pat. No. 5,096,276.

*(Official Gazette, March 2, 2004)*

UNITED STATES PATENT AND TRADEMARK OFFICE
CERTIFICATE OF CORRECTION

PATENT NO. : 5,181,267 C1  Page 1 of 1
DATED : October 15, 2002
INVENTOR(S) : Jeffrey T. Gerace et al.

It is certified that error appears in the above-identified patent and that said Letters Patent is hereby corrected as shown below:

Title page,
Reexamination, Item [56], References Cited, OTHER PUBLICATIONS, insert a third publication as follows:

-- Tachigami et al., "Precision Injection Molded Single Fiber Connector and its Application Field", Int'l Wire & Cable Symposium Proceedings, 1981(*). --.

Signed and Sealed this

Twenty-fifth Day of May, 2004

JON W. DUDAS
*Acting Director of the United States Patent and Trademark Office*

(12) REEXAMINATION CERTIFICATE (4655th)
United States Patent
Gerace et al.

(10) Number: US 5,181,267 C1
(45) Certificate Issued: Oct. 15, 2002

(54) SHEATH CONNECTOR FOR AN OPTICAL CABLE

(75) Inventors: Jeffrey T. Gerace, Harrisburg, PA (US); Alan E. Plotts, Harrisburg, PA (US); Frederic H. Abendschein, Columbia, PA (US)

(73) Assignee: Tyco Electronics Corporation, Middletown, PA (US)

Reexamination Request:
No. 90/006,056, Jul. 10, 2001

Reexamination Certificate for:
Patent No.: 5,181,267
Issued: Jan. 19, 1993
Appl. No.: 07/851,456
Filed: Mar. 16, 1992

Certificate of Correction issued Mar. 29, 1994.

(21) Appl. No.: 07/851,456

Related U.S. Application Data

(63) Continuation of application No. 07/450,330, filed on Dec. 13, 1989, now Pat. No. 5,096,276, which is a continuation-in-part of application No. 07/159,151, filed on Feb. 23, 1988, now abandoned.

(51) Int. Cl.⁷ .................................................. G02B 6/36
(52) U.S. Cl. .......................................... 385/86; 385/80
(58) Field of Search ............................. 385/78, 80, 86, 385/87, 69, 72

(56) References Cited

U.S. PATENT DOCUMENTS

| | | | |
|---|---|---|---|
| 4,168,109 A | 9/1979 | Dumire | 385/60 X |
| 4,184,742 A | 1/1980 | Corrales | 385/60 X |
| 4,215,913 A | 8/1980 | Turley et al. | 385/60 X |
| 4,218,113 A * | 8/1980 | Uberbacher | 385/60 X |
| 4,255,015 A | 3/1981 | Adams et al. | 385/62 X |
| 4,387,957 A | 6/1983 | Mignien | 385/64 X |
| 4,405,200 A | 9/1983 | Hoffmann et al. | 385/59 X |
| 4,418,983 A | 12/1983 | Bowen et al. | 385/55 X |
| 4,432,602 A | 2/1984 | Margolin | 385/76 X |
| 4,691,985 A | 9/1987 | Shank et al. | 385/33 X |
| 4,696,538 A * | 9/1987 | Despouys | 385/53 X |
| 4,738,507 A | 4/1988 | Palmquest | 385/67 X |
| 4,738,508 A | 4/1988 | Palmquest | 385/67 X |
| 4,747,659 A * | 5/1988 | Takahashi | 385/60 X |
| 4,759,599 A | 7/1988 | Yamaguchi et al. | 385/55 X |
| 4,762,389 A | 8/1988 | Kaihara | 385/60 X |
| 4,789,216 A | 12/1988 | Schrott | 385/60 X |
| 4,792,205 A * | 12/1988 | Yin et al. | 385/53 X |
| 4,834,487 A | 5/1989 | Abendschein et al. | 385/76 X |
| 4,863,235 A | 9/1989 | Anderson et al. | 385/60 X |
| 4,887,875 A | 12/1989 | Chang et al. | 385/62 X |
| 4,911,518 A | 3/1990 | Miller | 385/60 X |
| 4,953,941 A | 9/1990 | Takahashi | 385/52 X |
| 4,960,317 A | 10/1990 | Briggs et al. | 385/76 X |
| 5,000,536 A | 3/1991 | Anderson et al. | 385/60 X |
| 5,016,970 A | 5/1991 | Nagase et al. | 385/60 X |
| 5,076,656 A | 12/1991 | Briggs et al. | 385/71 |

FOREIGN PATENT DOCUMENTS

| | | | | |
|---|---|---|---|---|
| JP | 61-119107 | * | 7/1986 | 385/53 X |
| JP | 62-79405 | * | 4/1987 | 385/53 X |

OTHER PUBLICATIONS

"Amp Optimate 2.5mm Threaded Connector", Preliminary Instruction Sheet (Jun. 1986).*
Seiko Instructions for SAP–1 and SF–1 Connectors (No Date of Publication).*

* cited by examiner

*Primary Examiner*—Brian Healy

(57) ABSTRACT

A connector 1 for assembly with an optical cable 2 comprises, a shell 10 encircling a spring biased holder 13 for an optical fiber 3 of the cable 2, a sheath 16 to prevent leaking of adhesive 59 from the holder 13, and strength members 5 of the cable 2 anchored to the shell 10, whereby the holder 13 and the optical fiber 3 of the cable 2 are displaceable with respect to the strength members 5 of the cable 2.

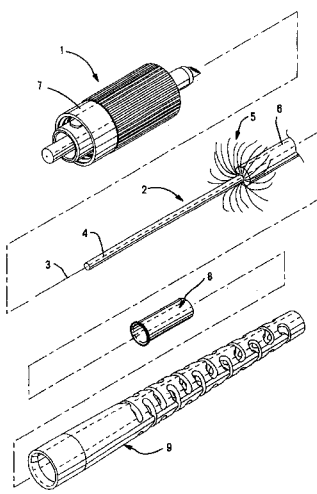

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *